United States Patent [19]

Charas et al.

[11] Patent Number: 5,404,570
[45] Date of Patent: Apr. 4, 1995

[54] RADIO COVERAGE IN CLOSED ENVIRONMENTS

[75] Inventors: Philippe Charas, Upplans Väsby; Stefan Källander, Lidingö, both of Sweden

[73] Assignee: Telefonaktiebolaget L M Ericsson, Stockholm, Sweden

[21] Appl. No.: 979,909

[22] Filed: Nov. 23, 1992

[51] Int. Cl.$^6$ .................. H04Q 7/02; H04B 7/26; H04B 7/15

[52] U.S. Cl. .................. 455/22; 455/33.3; 455/33.4; 455/56.1; 455/70; 379/59

[58] Field of Search .................. 455/14–16, 455/41, 66, 20, 22, 31.1, 1.1, 33.2, 54.1, 33.4, 33.3, 70; 379/59, 60

[56] References Cited

U.S. PATENT DOCUMENTS

| | | | |
|---|---|---|---|
| 3,750,020 | 7/1973 | Baba et al. | 455/14 |
| 3,868,575 | 2/1975 | Narbaits-Jaureguy et al. | 455/55.1 |
| 3,916,311 | 10/1975 | Martin et al. | 455/14 |
| 3,979,674 | 9/1976 | Martin | 455/14 |
| 4,476,574 | 10/1984 | Struven | 455/14 |
| 4,677,687 | 6/1987 | Matsuo | 455/33.2 |
| 4,718,108 | 1/1988 | Davidson et al. | 455/20 |
| 4,742,514 | 5/1988 | Goode et al. | 455/54.1 |
| 4,754,450 | 6/1988 | Lynk, Jr. et al. | 370/29 |
| 4,777,652 | 10/1988 | Stolarczyk | 455/14 |
| 4,873,711 | 10/1989 | Roberts et al. | 455/54.1 |
| 4,972,505 | 11/1990 | Isberg | 455/14 |
| 5,010,583 | 4/1991 | Parken | 455/15 |
| 5,018,165 | 5/1991 | Sohner et al. | 375/1 |
| 5,047,762 | 9/1991 | Bruckert | 455/33.4 |
| 5,058,201 | 10/1991 | Ishii et al. | 455/33.2 |
| 5,187,803 | 2/1993 | Sohner et al. | 455/14 |
| 5,187,806 | 2/1993 | Johnson et al. | 455/22 |
| 5,278,989 | 1/1994 | Burke et al. | 455/14 |

FOREIGN PATENT DOCUMENTS

| | | | |
|---|---|---|---|
| 0342858A3 | 11/1989 | European Pat. Off. | |
| 52-61902 | 5/1977 | Japan | 455/55.1 |
| 0027540 | 3/1981 | Japan | 455/14 |
| 2-79630A | 3/1990 | Japan | 455/55.1 |
| 2160074 | 12/1985 | United Kingdom | 455/14 |
| WO87/06082 | 10/1987 | WIPO | 455/54.1 |

OTHER PUBLICATIONS

Patent Abstracts of Japan, vol. 16, No. 297 (E-1226), abstract of JP, A, 4-79617, published on Mar. 13, 1992.
Patent Abstracts of Japan, vol. 7, No. 27 (E-156), abstract of JP, A, 57-181238, published on Nov. 8, 1982.
German Patent Publication No. DE 3621990 A1, published on Jan. 29, 1987.
International Search Report issued in connection with PCT International Application No. PCT/SE93/00992 on Mar. 9, 1994.

Primary Examiner—Edward F. Urban
Assistant Examiner—Mark D. Wisler
Attorney, Agent, or Firm—Burns, Doane, Swecker & Mathis

[57] ABSTRACT

A repeater system in a communication system including a base station and a mobile unit provides a communications link between the base station and the mobile unit when the mobile unit is located in an environment that is substantially closed off to high radio frequency communication between the base station and the mobile unit. The repeater system has a first linear two-way frequency converter including a high frequency port for two-way coupling to the base station and a low frequency port for two-way coupling to a low frequency signal that is capable of distributing radio frequency power through the closed environment. The low frequency port is connected to a cable which propagates and receives low radio frequency power within the closed environment. The repeater system also includes a first antenna for wireless coupling to the cable, and a second linear two-way frequency converter having a low frequency port connected to the first antenna for two-way coupling to a low frequency signal and a high frequency port for two-way coupling to a signal that is compatible with the high radio frequency signal used by the communications system. A second antenna is connected to the high frequency port of the second linear two-way frequency converter for wireless coupling of the second linear two-way frequency converter to a nearby mobile unit.

19 Claims, 3 Drawing Sheets

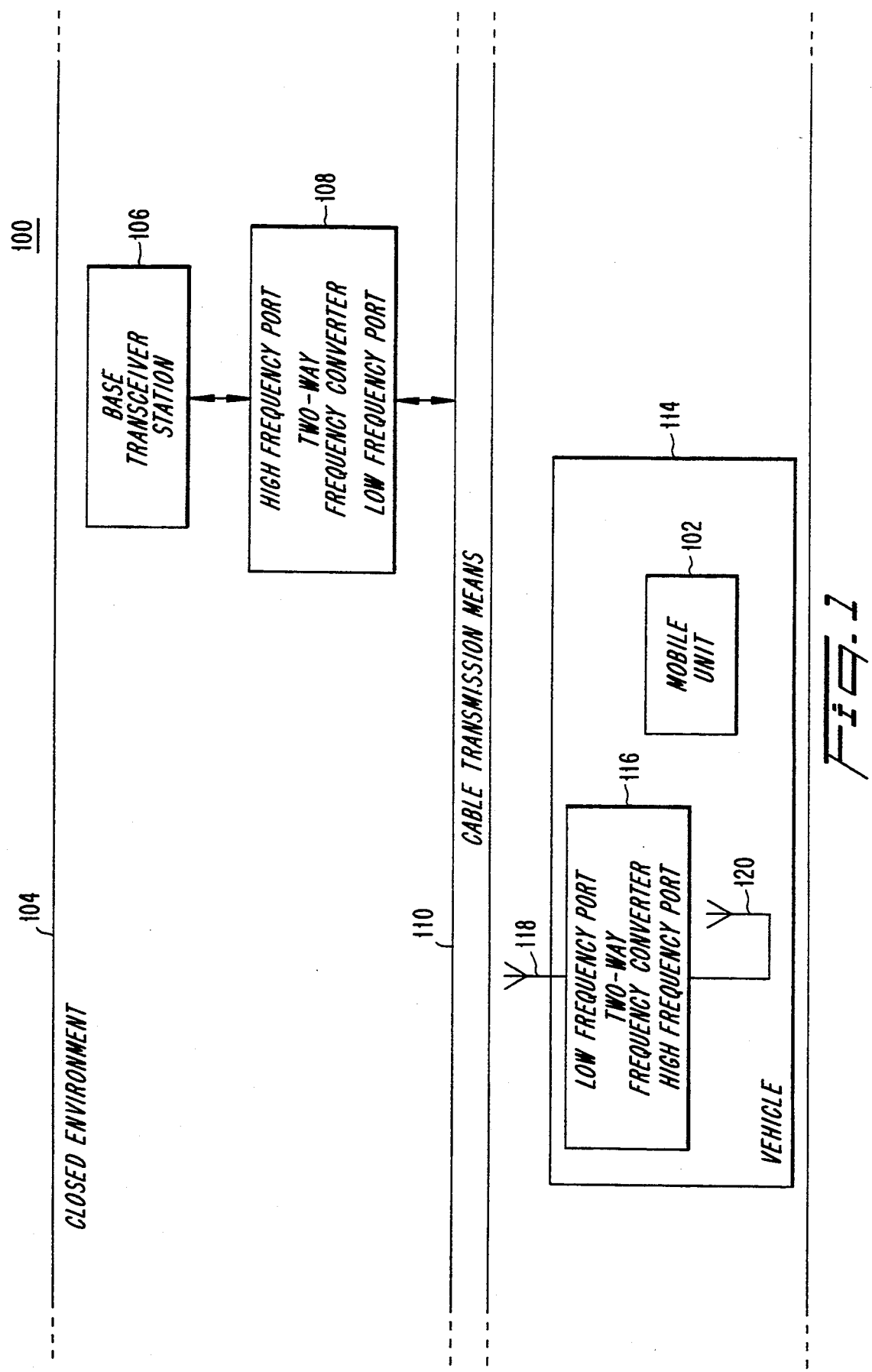

RADIO COVERAGE IN CLOSED ENVIRONMENTS

BACKGROUND OF THE INVENTION

1. Field of the Invention

The present invention relates to radio coverage in environments that are otherwise closed off to such coverage, and more particularly to cellular radio communications coverage in such closed off environments by means of repeaters, and even more particularly to a repeater system which converts communications system high radio frequency signals into low radio frequency signals for propagation in the closed off environment, and then back into high radio frequency signals.

2. Related Art

In a cellular telephone system, each portable telephone, referred to here as a mobile unit, is able to function only to the extent that it is able to send and receive radio signals to and from a base station associated with the system. However, in the real world environment there are impediments to normal radio communication. For example, at frequencies of approximately 1 GHz or higher, obstructions such as tunnels can attenuate the radio signal 50 dB/km up to total cut-off. The amount of attenuation will depend on circumstances such as the shape of the tunnel, and the presence of obstructions like trains. This attenuation makes the radio propagation environment erratic and unreliable.

Prior attempts to radiate radio frequency (RF) power into problematic isolated structures, referred to here as closed environments, include the use of leaky coaxial cable in the structure, and also the brute force approach of directing a large RF power level into the structure. However, such approaches have proven to be both expensive and prohibitively complicated.

SUMMARY OF THE INVENTION

It is therefore one object of the present invention to provide a simple and cost effective approach to providing radio coverage in closed environments.

Another object of the invention is to extend a cellular telephone architecture into a closed environment so that the closed environment is subdivided into several cells, and to provide for the hand off of frequencies between them as a mobile unit moves from one cell to another.

A further object of the invention is to offer a simple and cost effective solution which can be implemented as an "add-on kit" to present radio hardware without substantial change or extra cost to this hardware.

According to the present invention, the foregoing and other objects are attained in a repeater system for use in a communication system that includes a base station and a mobile unit, both operating at a high radio frequency. The repeater system provides a communications link between the base station and the mobile unit when the mobile unit is located in an environment that is substantially closed off to high radio frequency communication between the base station and the mobile unit. The repeater system comprises a first linear two-way frequency converter including a high frequency port for two-way coupling to the base station, and a low frequency port for two-way coupling to a low frequency signal that is capable of distributing frequency power through the closed environment. The repeater system also includes cable transmission means connected to the low frequency port of the first linear two-way frequency converter. The cable transmission means is located within the closed environment for radiating the low frequency converted signals within the closed environment. The repeater system also includes a first antenna for wireless coupling to the cable transmission means, and a second linear two-way frequency converter including a low frequency port connected to the first antenna for two-way coupling to a low frequency signal, and a high frequency port for two-way coupling to a signal that is compatible with the high radio frequency signal used by the communications system. The repeater system also has a second antenna connected to the high frequency port of the second linear two-way frequency converter.

With the above-described structure, a mobil unit in the vicinity of the second antenna can communicate with the base station in a normal fashion. The conversion of the high frequency signal into a low frequency signal and then back again into a high frequency signal is completely transparent to both the mobile unit and the base station.

In another embodiment of the above-described repeater system, the first antenna, second linear two-way frequency converter, and second antenna are located within a vehicle, and the cable transmission means is distributed along an anticipated path of the vehicle through the closed environment. As used throughout this specification, the term "vehicle" is used to represent a conveyance within which a mobile unit is to be able to operate. For example, the vehicle may be a train car travelling through a tunnel as part of a subway system. In this example, a passenger on the train is able to use a mobil unit to communicate with the base station by means of the repeater system. This is because a train car so equipped becomes a mobile base station that services a moving cell that is defined by the confines of the train itself. A passenger on the train may use a mobile unit the same as he or she would outside of the subway system.

Besides providing normal communications service to a mobile unit located on a vehicle that is travelling within a closed environment, a further advantage of the described mobile base station is that the high radio frequency power level need only be strong enough to propagate through the train car (i.e., the moving cell). This keeps the total radiated power in the closed environment at a low level compared to the high level of output power that would be required to propagate the high radio frequency signal throughout the tunnel for direct reception by a mobile unit on a train. Other environmental benefits are achieved by not having to subject passengers and other equipment to high levels of radio wave energy. Instead, passengers are only subjected to the lower power signal transmitted by the second antenna on board the train.

Another feature of the repeater system is useful, for example, when a communication system has a base station located in each of adjacent subway stations. Here, the cable transmission means is associated with a first base station, and a terminal portion of the cable transmission means overlaps a corresponding terminal portion of a cable transmission means that is associated with a second base station. The region of overlap should be sufficient to permit the vehicle, in this case a train car, to simultaneously pass by the terminal portions of both cable transmission means for at least several seconds when the vehicle is travelling at a typical speed away from the first base station and toward the second base station. This avoids the problem of having all mobile units on board the train, travelling away from the first base station and toward the second base station, handed off from the first base station to the second base station at the same time.

Also, in the example of a mobil unit located on a moving vehicle, the above-described repeater system may further include a sensor coupled to the second linear two-way frequency converter for alternatively turning the second linear two-way frequency converter on and off in response to respectively sensing the vehicle entering and exiting the closed environment.

In another embodiment of the repeater system, the high radio frequency is in a range of 900 to 2000 megahertz, and the low frequency is in a range of 30 to 300 megahertz.

In yet another embodiment of the repeater system, the cable transmission means is a bifilar cable.

In still another embodiment of the repeater system, the cable transmission means comprises a coaxial cable connected to the first linear two-way frequency converter, an amplifier having an input connected to the coaxial cable, and a third antenna connected to an output of the amplifier.

In another embodiment of the repeater system, the first and second linear two-way frequency converters are phase locked to a system clock. This avoids interference problems if two or more vehicles are close to each other and are receiving signals from the same base station.

BRIEF DESCRIPTION OF THE DRAWINGS

FIG. 1 is a block diagram of one embodiment of the system in accordance with the present invention.

DESCRIPTION OF THE PREFERRED EMBODIMENT

Figure 2A:
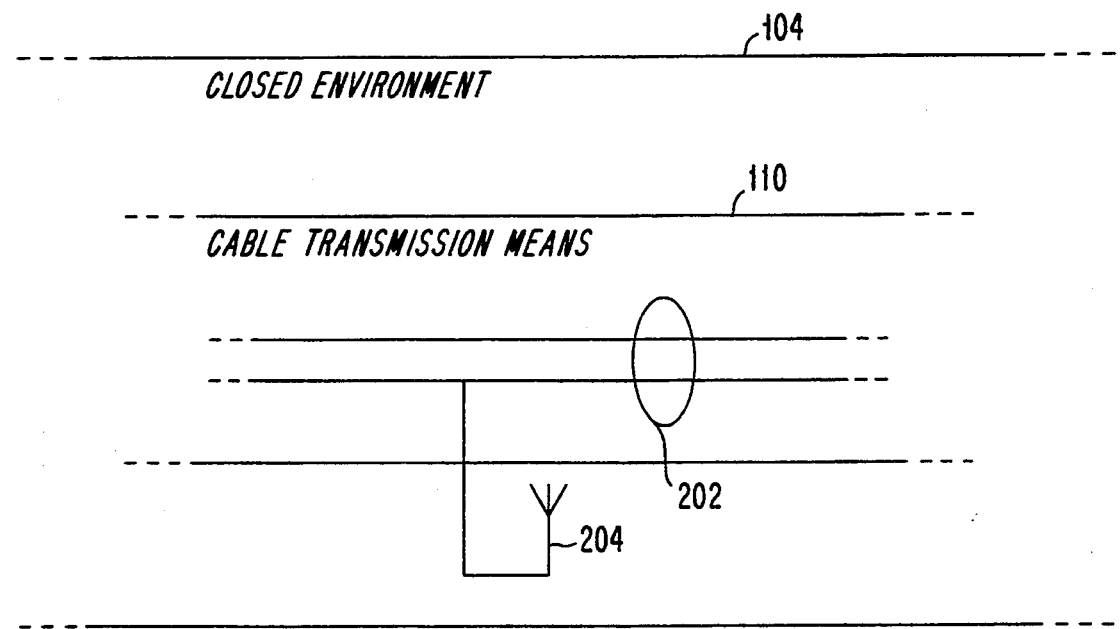
FIGS. 2a and 2b are more detailed block diagrams showing two preferred embodiments of the cable transmission means for use in the present invention.

The present invention provides radio coverage to closed environments by recognizing that the radio frequency environment consists of two parts: a first environment in which the radio signal is propagated up to, but not within, the closed environment; and a second environment consisting of the area located within the closed environment. Methods for propagating a radio signal in the first environment, which does not present the above-described signal obstruction problems, are well known to those of ordinary skill in the art, and need not be described here. Cellular telephone systems functioning in this first environment typically radiate RF power in the 900–2000 megahertz (MHz) range. Both the mobile units and the base stations of such a system are adapted to transmit and receive in this frequency range.

Propagation of the signal within the second, closed environment can be accomplished by propagating a low radio frequency signal, preferably in the range 30–300 MHz, through either a coaxial or a bifilar conductor located within the closed environment. However, it should be readily apparent that a typical mobile unit is not capable of operating in this frequency range, and cannot directly take advantage of such a signal.

Referring to FIG. 1, a preferred embodiment of a system 100 for enabling a mobile unit 102 to continue to operate within a closed environment 104 is shown. The system 100 includes a multi-channel Base Transceiver Station (BTS) 106 associated with a cellular telephone system (not shown). The BTS 106 operates on a frequency that is compatible with the cellular telephone system. For the purposes of this description, it will be presumed that the BTS 106 transmits and receives RF power in the 1500 MHz band with a 45 MHz duplex distance between uplink and downlink frequencies.

The closed environment 104 may be a tunnel that is part of a subway system. In such a case, a BTS 106 is preferably placed in each underground station, with BTS's 106 located at adjacent underground stations operating at different frequencies in accordance with frequency allocation requirements for ordinary cell planning.

In order to communicate with the mobile unit 102 located in the closed environment 104, the BTS 106 is connected to the high-frequency port of a first linear two-way frequency converter 108. The low frequency port of the first frequency converter 108 is connected to cable transmission means 110. The function of the first frequency converter 108 is to convert the 1500 MHz signal that is output by the BTS 106 into a low frequency RF signal which can be propagated into the closed environment 104 by means of the cable transmission means 110 which is distributed throughout the closed environment 104, preferably along an anticipated path of the vehicle 114 containing a mobile unit 102. For purposes of discussion, it will be assumed that this low frequency RF signal is 200 MHz.

The first frequency converter 108 also converts low frequency RF signals, which may be received from another source and propagated by the cable transmission means 110, into high frequency signals for reception by the BTS 106. Thus, in the illustrative example, a 200 MHz signal propagated by the cable transmission means 110 would be converted to a 1500 MHz signal for use by the BTS 106.

Figure 2B:
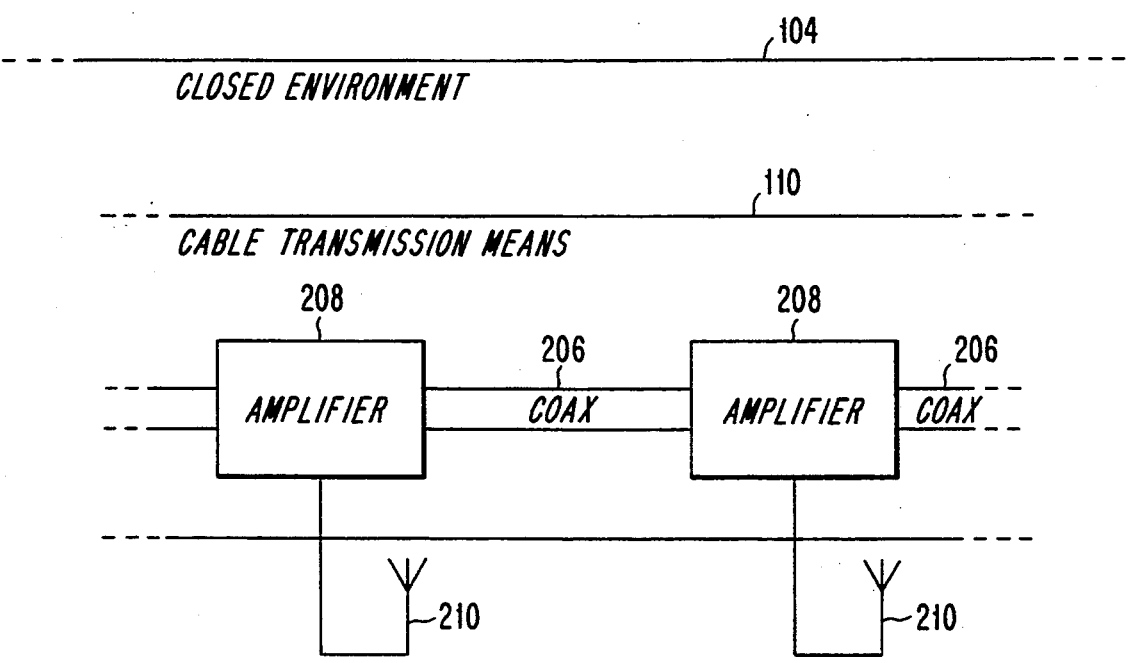

It has been mentioned that the function of the cable transmission means 110 is to propagate a low frequency RF signal throughout the closed environment 104. FIGS. 2a and 2b illustrate two different embodiments for accomplishing this. FIG. 2a shows the cable transmission means 110 implemented as a simple bifilar cable 202 connected to simple radiators 204, such as dipole antennas, that are located throughout the closed environment 104. Power from the low frequency RF signal is then radiated into the closed environment 104 through the simple radiators 204 as well as through the bifilar cable 202 itself. The same bifilar cable 202 may be used to propagate a low frequency RF signal that is received, as described below, within the closed environment 104, for reception by the low frequency port of the first frequency converter 108.

An alternative embodiment of the cable transmission means 110 is shown in FIG. 2b. Here, an inexpensive coaxial cable 206 distributes the low frequency RF signal to a series of simple low cost amplifiers 208, each connected to an antenna 210. The amplifier 208/antenna 210 combinations can be placed at every 100 m along the closed environment. Output power can be maintained at a very low level that is amplified by each successive amplifier 208. Each amplifier 208 should be capable of amplifying signals travelling in two directions, that is, into and out of the first frequency converter 108. The purpose of this two way signal propagation is to permit bidirectional communication between a mobile unit 102 and the BTS 106. This is described in greater detail below.

Another alternative embodiment of the cable transmission means 110 is to use two cables in parallel, each dedicated to propagating a signal in only one direction. For example, the cable transmission means 110 may be embodied by two bifilar cable 202/radiator 204 combinations which are both distributed along the same path in the closed environment 104. In this case, each bifilar cable 202 is dedicated to propagation of a low frequency RF signal in only one direction, either into or out of the first frequency converter 108.

Referring back to FIG. 1, the mobile unit 102 is located inside a vehicle 114, which may be a train car. Associated with the vehicle 114 is a second linear two-way frequency converter 116. The second frequency converter 116 is connected at its low frequency port to a first antenna 118. The first antenna 118 is located on the outside of the vehicle 118 as close as possible to the radiating cable transmission means 110, to enable it to receive and transmit the low frequency RF signal.

The second frequency converter 116 is connected at its high frequency port to a second antenna 220, which transmits and receives the high RF signal inside the vehicle 118.

The first and second frequency converters 108, 116 are phase locked to the system clock so that their output frequencies will be synchronized with one another. This is necessary in order to avoid interference problems if two or more vehicles 114 (only one shown) are close to each other and are receiving signals from the same BTS 106.

With the configuration described above, each vehicle 114 is treated as an extended BTS cell, allowing hand held cellular telephones to be used in the ordinary way.

The above-described system 100, involving the use of frequency conversion, is preferably part of a digital communications system that utilizes a Frequency Division Multiple Access (FDMA), Time Division Multiple Access (TDMA), or Code Division Multiple Access (CDMA) method of transmission. However, it could also be used in an analog communications system.

Figure 3:
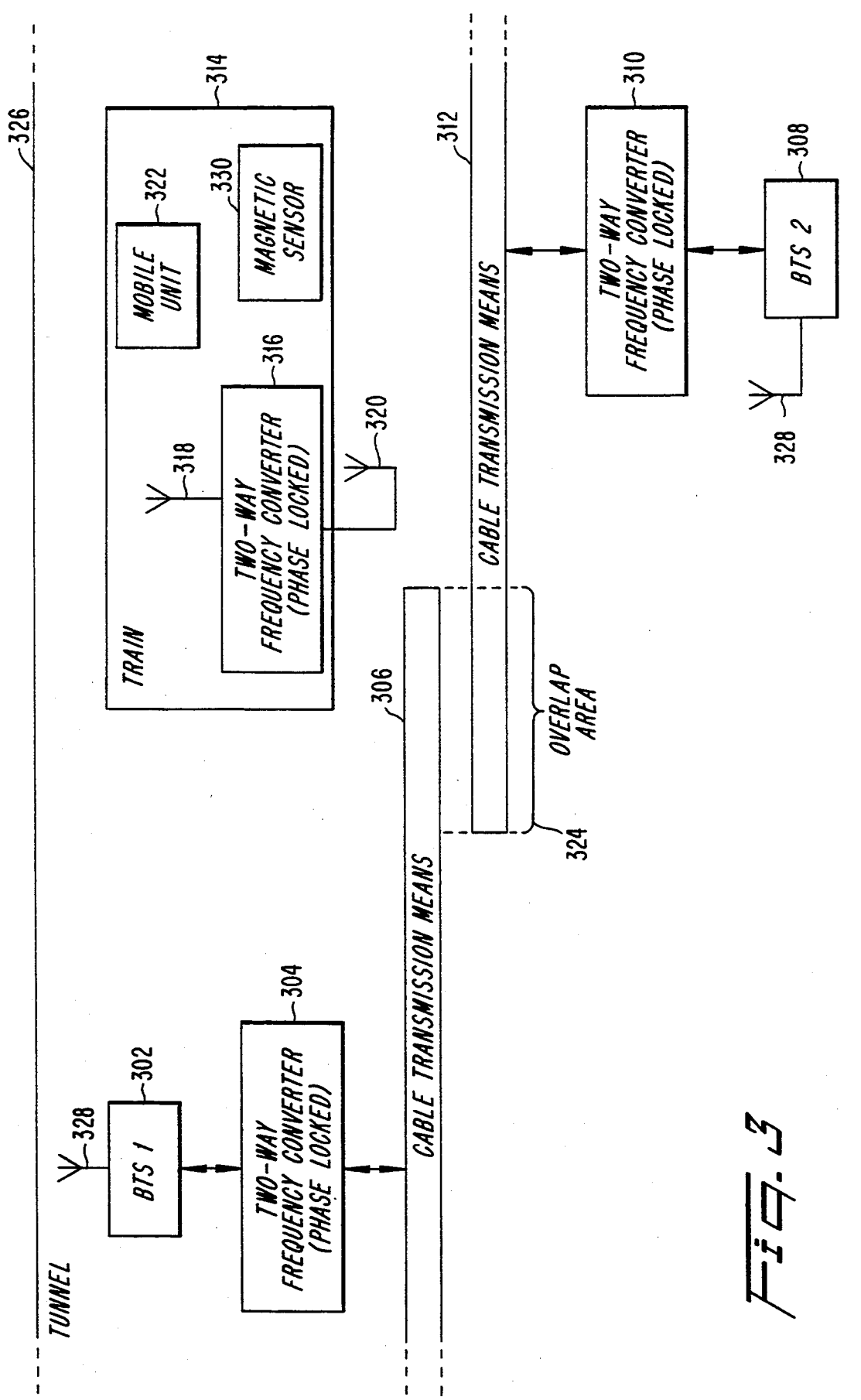
FIG. 3 is a block diagram showing another embodiment of the present invention.

Referring now to FIG. 3, an example is shown in which the vehicle 114 is one car in a train 314 in a subway system. A first BTS 302 is located at a first subway station, and a second BTS 308 is located at a second subway station that is adjacent the first. The first BTS 302 communicates with a mobile unit 322 located on the train 314 by propagating its low RF frequency signal along the first cable transmission means 306, which may preferably be either of the embodiments described above with respect to FIGS. 2a and 2b. As the train 314 moves away from the first station toward the second station, it will be necessary for the first BTS 302 to hand off the call to the second BTS 308. In order to prevent all mobile units 322 from making hand offs at the same time, terminal portions of the first and second cable transmission means 306, 312 should overlap one another. The amount of overlap 324 should be designed to permit the second antenna 320, mounted on the vehicle, to be near both the first and second cable transmission means 306, 312 for several seconds when the train 314 is travelling at a typical speed. For example, the system may be designed to permit the second antenna 320 to be near both the first and second cable transmission means 306 for about 5 seconds when the train 314 is travelling at a speed of 20 meters per second by allowing terminal portions of the first and second cable transmission means 306, 312 to overlap one another for a length of about 100 meters. This will allow the second antenna 320 to experience a gradual decrease in received power as it leaves the coverage area of the first BTS 302 while at the same time experiencing a gradual increase in received power as it approaches the coverage area of the second BTS 308.

In another feature of the present invention, the two-way frequency converter 316 located inside the train 314 is switched off when the train 314 leaves the tunnel 326 and comes under the coverage of an another BTS cell that does not provide service to the closed environment (not shown). Similarly, the frequency converter 316 located inside the train 314 is switched on when the train 314 enters a tunnel 326. The switching on and off of the frequency converter 316 is activated by a magnetic sensor 330, or the like, in the train that senses the emerging entrance into and exit from the tunnel 326, and sends appropriate signals to the frequency converter 316.

It is important to note that when the train 314 leaves the tunnel 326, causing the two-way frequency converter 316 to be switched off, a mobile unit 322 in use at the time must quickly be handed off to an outside BTS cell that does not provide service to the closed environment (not shown). Thus, the outside BTS cell should provide good coverage to the area just outside the tunnel. To achieve this, an outside BTS cell may preferably be placed at the exit of the tunnel 326.

In another feature of the present invention, each BTS 302, 308 has a third antenna 328 which enables it to directly serve any mobile unit being operated at the subway station. Thus, a passenger who is utilizing a mobile unit 322 at a subway station may continue to be serviced by the same BTS 302, 308 as he or she moves from the station platform to the train 322. The same is true when a passenger who is using a mobile unit 322 leaves the train 322 and steps onto a station platform.

The invention has been described with reference to particular embodiment. However, it will be readily apparent to those skilled in the art that it is possible to embody the invention in specific forms other than those of the preferred embodiment described above. This may be done without departing from the spirit of the invention. For example, if only one-way communication is required, then the two linear frequency converters need only be capable of converting signals in one direction. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. In a communications system including a base station and a mobile unit, both operating at a high radio frequency, a repeater system for providing a communications link between the base station and the mobile unit when the mobile unit is located in an environment that is substantially closed off to high radio frequency communication between the ase station and the mobile unit, the repeater system comprising:
   a first linear two-way frequency converter including:
     a high frequency port for two-way coupling to the base station; and a low frequency port for two-way coupling to a low frequency signal having a frequency that is capable of radiating radio frequency power through the closed environment, the low frequency signal being in a frequency band that is lower than a frequency band of the high frequency port;

cable transmission means connected to the low frequency port of the first linear two-way frequency converter, and located within the closed environment for radiating and receiving the low frequency signal within the closed environment;

a first antenna for wireless coupling to the cable transmission means;

a second linear two-way frequency converter including:

a low frequency port connected to the first antenna for two-way coupling to the low frequency signal; and a high frequency port for two-way coupling to a high radio frequency signal having a frequency that is compatible with the high radio frequency used by the communications system; and a second antenna connected to the high frequency port of the second linear two-way frequency converter.

2. The repeater system of claim 1 wherein the first antenna, second linear two-way frequency converter, and second antenna are disposed on a vehicle, and the cable transmission means is distributed along an anticipated path of the vehicle through the closed environment.

3. The repeater system of claim 2 wherein the cable transmission means is associated with a first base station, and a terminal portion of the cable transmission means overlaps, for a predetermined length, a corresponding terminal portion of a cable transmission means associated with a second base station, the predetermined length being sufficient to permit the vehicle to simultaneously pass by the terminal portions of both cable transmission means for at least several seconds when the vehicle is travelling at a predetermined speed away from the first base station and toward the second base station.

4. The repeater system of claim 2 wherein the vehicle further includes a sensor coupled to the second linear two-way frequency converter for alternatively turning the second linear two-way frequency converter on and off in response to respectively sensing the vehicle entering and exiting the closed environment.

5. The repeater system of claim 2 wherein the high radio frequency is in a range of 900 to 2000 megahertz, and the low frequency is in a range of 30 to 300 megahertz.

6. The repeater system of claim 2 wherein the cable transmission means is a bifilar cable.

7. The repeater system of claim 2 wherein the cable transmission means comprises:

a coaxial cable, connected to the first linear two-way frequency converter;

an amplifier having an input connected to the coaxial cable; and a third antenna connected to an output of the amplifier.

8. The repeater system of claim 2 wherein the first and second linear two-way frequency converters are phase locked to a system clock.

9. The repeater system of claim 2 wherein the base station is located at a passenger station situated along an anticipated path of the vehicle, the base station is coupled to the high frequency port of the first linear two-way frequency converter, and wherein the base station includes a fourth antenna for wireless, high radio frequency coupling to a mobile unit.

10. The repeater system of claim 1 wherein the high radio frequency is in a range of 900 to 2000 megahertz, and the low frequency is in a range of 30 to 300 megahertz.

11. The repeater system of claim 1 wherein the cable transmission means is a bifilar cable.

12. The repeater system of claim 1 wherein the cable transmission means comprises:

a coaxial cable, connected to the first linear two-way frequency converter;

an amplifier having an input connected to the coaxial cable; and a third antenna connected to an output of the amplifier.

13. The repeater system of claim 1 wherein the first and second linear two-way frequency converters are phase locked to a system clock.

14. In a communications system including a base station and a mobile unit, both operating at a high radio frequency, a method for communicating between the base station and the mobile unit when the mobile unit is located in an environment that is substantially closed off to high radio frequency communication between the base station and the mobile unit, comprising the steps of:

linearly converting a base station high radio frequency signal into a low frequency signal that is capable of radiating radio frequency power into the closed environment, the low frequency signal being in a frequency band that is lower than a frequency band of the high radio frequency signal;

using cable transmission means to distribute the low frequency signal within the closed environment;

receiving the distributed low frequency signal in a first antenna;

linearly converting the received low frequency signal into a reconverted high radio frequency signal; and using a second antenna to transmit the reconverted high radio frequency signal to the mobile unit.

15. The method of claim 14 wherein the steps of receiving, linearly converting the received low frequency signal, and using a second antenna to transmit are performed on a vehicle.

16. In a communications system including a base station and a mobile unit, both operating at a high radio frequency, a method for communicating between the base station and the mobile unit when the mobile unit is located in an environment that is substantially closed off to high radio frequency communication between the base station and the mobile unit, comprising the steps of:

using a second antenna to receive a high radio frequency signal from the mobile unit;

linearly converting the received high radio frequency signal into a low frequency signal that is capable of radiating radio frequency power into the closed environment, the low frequency signal being in a frequency band that is lower than a frequency band of the high radio frequency signal;

radiating the low frequency signal from a first antenna;

using cable transmission means to receive the low frequency signal within the closed environment;

linearly converting the received low frequency signal into a base station high radio frequency signal; and outputting the base station high radio frequency signal to the base station.

17. The method of claim 16 wherein the steps of using a second antenna to receive, linearly converting the received high radio frequency signal, and radiating are performed on a vehicle.

18. In a communications system including at least one stationary base station and a mobile unit, both operating at a high radio frequency, a mobile base station for providing communication system service to the mobile unit when the mobile unit is located in a vehicle that is travelling in an environment that is substantially closed off to high radio frequency communication between the stationary base station and the mobile unit, the mobile base station comprising:

first means, disposed on the vehicle, for wireless coupling to a cable transmission means, coupled to a stationary base station, for two-way, low frequency signal propagation within the closed environment;

a linear two-way frequency converter, disposed on the vehicle, including:

a low frequency port connected to the first wireless coupling means for two-way coupling to a low frequency signal; and a high frequency port for two-way coupling to a high radio frequency signal that is compatible with the high radio frequency used by the communications system, the high radio frequency signal being in a frequency band that is higher than a frequency band of the low frequency signal; and second means, disposed on the vehicle and connected to the high frequency port of the linear two-way frequency converter, for wireless high radio frequency coupling to the mobile unit located in the vehicle.

19. The mobile base station of claim 18 wherein the first wireless coupling means and second wireless coupling means are, respectively, first and second antennas.

* * * * *